(12) United States Patent
Inoue

(10) Patent No.: US 7,899,953 B2
(45) Date of Patent: Mar. 1, 2011

(54) DATA TRANSFER SYSTEM

(75) Inventor: Hideo Inoue, Kanagawa (JP)

(73) Assignee: NuFlare Technology, Inc., Numazu-shi (JP)

( * ) Notice: Subject to any disclaimer, the term of this patent is extended or adjusted under 35 U.S.C. 154(b) by 340 days.

(21) Appl. No.: 12/103,732

(22) Filed: Apr. 16, 2008

(65) Prior Publication Data

US 2008/0263236 A1 Oct. 23, 2008

(30) Foreign Application Priority Data

Apr. 20, 2007 (JP) ............................ 2007-112203

(51) Int. Cl.
*G06F 13/28* (2006.01)
(52) U.S. Cl. ............................ 710/22; 710/33; 710/35; 709/201; 709/202
(58) Field of Classification Search ....................... None
See application file for complete search history.

(56) References Cited

U.S. PATENT DOCUMENTS

| 6,728,722 | B1 * | 4/2004 | Shaylor ............................. 1/1 |
| 7,124,205 | B2 * | 10/2006 | Craft et al. .................. 709/250 |
| 2006/0289797 | A1 * | 12/2006 | Inanami et al. .......... 250/492.2 |

FOREIGN PATENT DOCUMENTS

JP 2005-94412 4/2005

* cited by examiner

*Primary Examiner* — Eron J Sorrell
(74) *Attorney, Agent, or Firm* — Oblon, Spivak, McClelland, Maier & Neustadt, L.L.P.

(57) ABSTRACT

A data transfer system is provided, in which divided data generated by data generation terminals are randomly transmitted to data transfer apparatuses by a host terminal, a parameter list controlling the order of transfer of divided data is generated by a parameter list generation part, and a transfer processing part transfers divided data transferred in a DMA mode to an electron beam drawing apparatus according to the parameter list through a general-purpose high-speed data transfer bus by bypassing a CPU.

10 Claims, 9 Drawing Sheets

DATA TRANSFER SYSTEM

BACKGROUND OF THE INVENTION

1. Field of the Invention

The present invention relates to a data transfer system that transfers control data to a predetermined apparatus via a data transfer apparatus and, more particularly, to a data transfer system that transfers a large volume of control data at high speed.

2. Related Background of the Invention

When a large volume of control data generated in a control workstation is transferred to an apparatus to be controlled via a data transfer apparatus, a high-speed data transfer is required in order to improve total throughput.

An example of an electron beam drawing apparatus is described as the apparatus to be controlled. Conventionally, for the connection processing between a control workstation and an interface of a data transfer apparatus, a data transfer system (data transfer method, electron beam apparatus) has been proposed. Japanese Unexamined Patent Publication (Kokai) No. 2005-94412 (claim 1, page 4) is an example of the prior art. In this prior art a subcommand, which is a set of a data transfer command and data to be written to a specified address, and a compound command having a compound command header including the number of subcommands, number of words, control bytes, transfer time of information, etc., are formed into one frame and the frame is transmitted to the interface, and after the transmission is completed, a response command is transmitted from the interface to the control workstation.

According to the system, it is possible to increase the effective transfer rate because the connection processing for each time of transfer of command data is no longer necessary.

The conventional data transfer system (refer to FIG. 5) described above relates to the connection processing between a control workstation 4 and a data transfer apparatus 5, however, recently, even shot expansion is performed on the side of a data transfer apparatus, and therefore, in order to improve the throughput of the entire system, it is also necessary to increase the data transfer rate between the data transfer apparatus 5 and an electron beam drawing apparatus 7.

The data transfer between the data transfer apparatus 5 and the electron beam drawing apparatus 7 has been performed, in order to assure a band for transferring a large volume of control data, by dividing the control data and directly transferring each of the divided data from a plurality of interfaces provided in the data transfer apparatus 5 to a memory 71 of the electron beam drawing apparatus 7 via a plurality of dedicated buses each corresponding to each interface. For example, if it is assumed that the data transfer rate on one of the dedicated buses is 200 MB/s, when the data transfer rate exceeds 500 MB/s for the whole of control data, three interfaces 51a, 51b, and 51c and three dedicated buses 6a, 6b, and 6c are necessary.

The memory 71 is divided into three modules 71a, 71b, and 71c, each corresponding to each of the dedicated buses 6a, 6b, and 6c. Based on the divided data stored in each of the modules 71a, 71b, and 71c, a stripe is drawn by controlling the electron beam drawing apparatus 7 and moving a stage in the direction of the arrow in a frame F1. When drawing for one stripe data is completed with one of stripe data, the drawing stage is forwarded stepwise to a neighboring stripe region and drawing is performed based on stripe data assigned to a new stripe region. After that, by repeating the drawing operation while moving the stage continuously, a desired device pattern is drawn on a wafer.

However, the stage movement speed in the direction of drawing of the stripe is determined by the highest shot density in the stripe, and therefore, in the conventional transfer system described above, there has been a problem in that if the transfer of some of divided data is delayed, even if part of the memory is released, it is not possible to use the released memory sequentially because synchronization is taken in order to maintain the order of processing of the divided data, and as a result, the transfer of divided data is stopped and the processing time is wasted on the whole.

For example, in a frame F2 in FIG. 5, the shot density in a region II is much higher than that in regions I and III, and therefore, the stage movement speed of the frame F2 is determined by the region II.

The divided data corresponding to the region I are stored in the module 71a, the divided data corresponding to the region II are stored in the module 71b, and the divided data corresponding to the region III are stored in the module 71c.

As a result, in the frame F2, even if the drawing processing in the regions I and III is completed, it is not possible to advance the drawing processing based on the next divided data to be transferred to the modules 71a and 71c until the drawing processing in the region II is completed and therefore there are no choices other than stopping the stepwise forwarding to the next stripe region.

In addition, since the memory of the electron beam drawing apparatus is directly connected in module units with the plurality of the dedicated buses in a one-to-one manner, there is also a problem in that the divided data to be transferred are restricted by the capacity of the memory (module). If data exceeding the memory capacity described above are transferred, there also arises a problem in that the processing of the electron beam drawing apparatus will be stopped.

The above-mentioned problems will occur similarly in data transfer systems in which a large volume of control data are divided and the order of processing of the divided data needs to be controlled, not limited only to the electron beam drawing apparatus.

SUMMARY OF THE INVENTION

With the above drawbacks of the prior art being taken into consideration, it is an advantage of the present invention to provide a data transfer system capable of realizing high-speed transfer processing not depending on the size of a memory by dividing a large volume of control data and controlling the order of processing of the divided data between a data transfer apparatus and an apparatus to be controlled, such as an electron beam drawing apparatus.

A data transfer system according to the present invention comprises: a plurality of data generation terminals that generate divided data of apparatus control data; a host terminal that is connected communicably to each data generation terminal for performing transmission control of each of the divided data; a data transfer apparatus that randomly receives the divided data to store the data in a memory and transfers the divided data from an extension card corresponding to a general purpose high-speed data transfer bus; and a predetermined apparatus to be controlled by the transferred divided data, wherein the data transfer apparatus includes: a parameter list generation means that reads information specifying the order of transfer among information constituting the divided data from the divided data stored in the memory and generates a transfer parameter list in order to control the predetermined apparatus; and a transfer processing means that sets the parameter list to the extension card, receives divided data transferred in a DMA mode from the memory via the high-speed data transfer bus by bypassing a CPU, and transfers the divided data to a memory on the side of the predetermined apparatus according to the order recorded in the set parameter list.

A general purpose personal computer may be used for each of the above host terminal, the data generation terminal, and the data transfer apparatus, and a bus whose standard is adopted in a general purpose personal computer, that is, a PCI-X bus or a PCIexpress, may be used for the high-speed data transfer bus of the data transfer apparatus.

According to the above configuration, it is possible to perform high-speed transfer while automatically controlling the order of processing of divided data.

As to the above information about the order of transfer of divided data, it is only necessary to extract address information and data size information from each of the divided data.

Further, the processing performance of the above large volume of control data is improved if two or more of the data transfer apparatuses are used, however, in this case, even if two or more divided data of which the destination addresses of which are not consecutive are received, it is not possible to generate the above parameter list.

Thus the host terminal may comprise a transmission control means to form block data into which the two or more divided data having consecutive address information are grouped randomly in a range not exceeding the maximum memory size of each data transfer apparatus and to cause the above host terminal to comprise a transmission control means for transmitting the data in units of the block data to each data transfer apparatus.

The divided data in the block data may be grouped randomly when received by the data transfer apparatus as described above because the order of transfer is controlled by the parameter list when transferred.

While the processing from that of receiving the above divided data until that of setting the parameter list is executed, it is not possible for the data transfer apparatus to transfer data to the apparatus to be controlled. Thus, it is required for the transfer of the block data and the generation and setting of the parameter list to be processed in parallel by the different data transfer apparatuses and for the transmission control means of the host terminal to control the timing of transmission of the block data from each data generation terminal so that the divided data are transferred sequentially in succession.

When the size of the above block data exceeds the memory size of the apparatus to be controlled, the transfer processing will stop. Therefore, a memory of the apparatus to be controlled may be divided into a plurality of modules of a one-dimensional array and each module may be assigned with addresses of a multi-dimensional manner to form a memory bank, and the apparatus to be controlled may be provided with a switching means that switches addresses in order to store each of the divided data constituting the block data in consecutive address spaces when the block data are transferred.

As obvious from the above description, the data transfer system according to the present invention brings about the effect that the realization of high-speed transfer processing is made possible by dividing large volume of control data and controlling the order of processing of the divided data between the data transfer apparatus and the apparatus to be controlled, such as an electron beam drawing apparatus.

Further, the effect is brought about that it is possible to transfer divided data sequentially in succession from the plurality of the data transfer apparatuses without being limited to the physical memory size by forming a memory bank on the side of the apparatus to be controlled.

DESCRIPTION OF THE PREFERRED EMBODIMENTS

In the present embodiment, a data transfer system according to the present invention will be described using a data transfer system that controls an electron beam drawing apparatus, however, the data transfer system can also be applied to those other than an electron beam drawing apparatus as long as in the data transfer system, a large volume of control data are divided and the order of processing of the divided data is controlled.

Figure 1A:
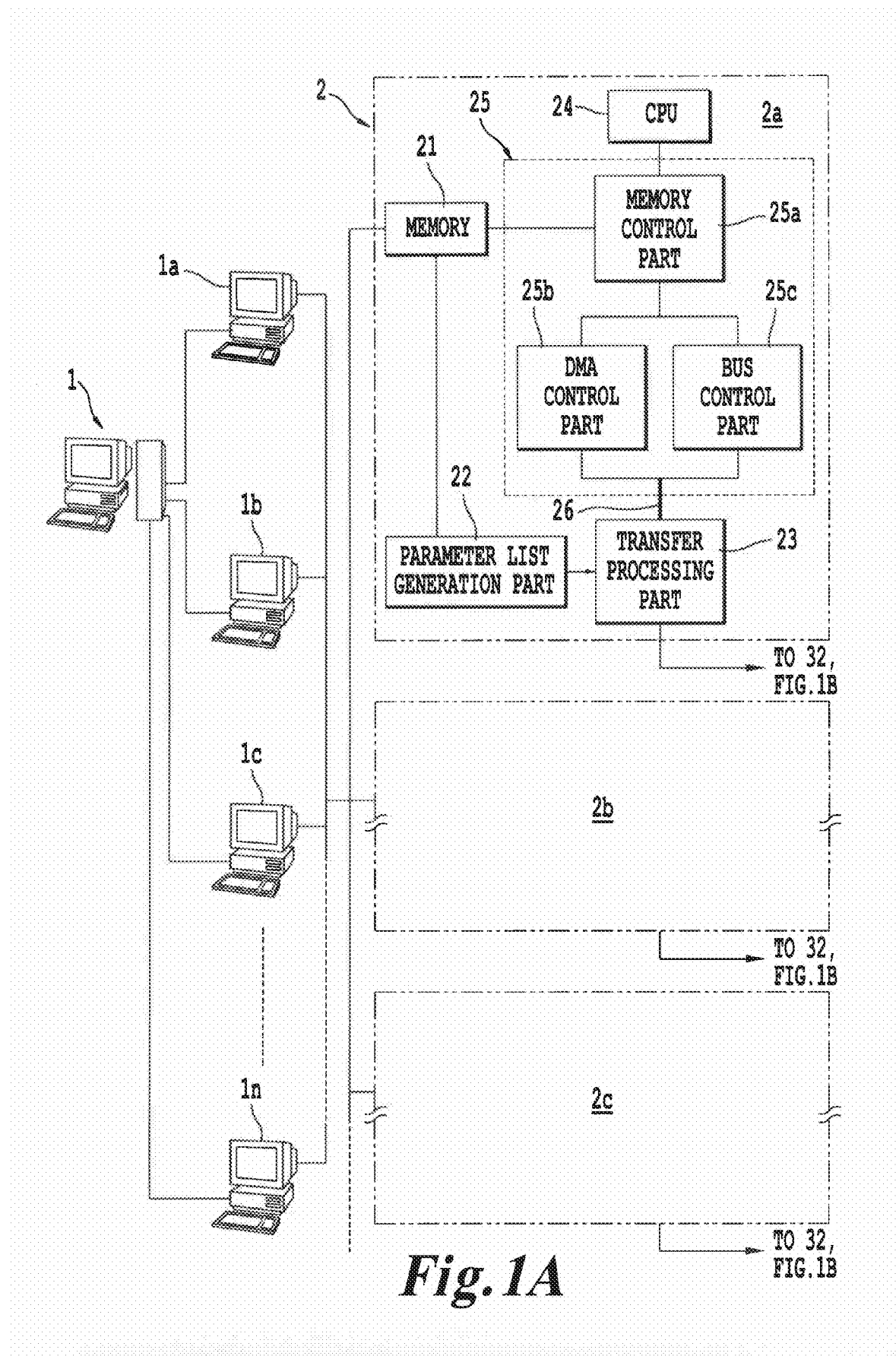
FIG. 1 is a configuration block diagram of a data transfer system according to the present invention.
Figure 1B:
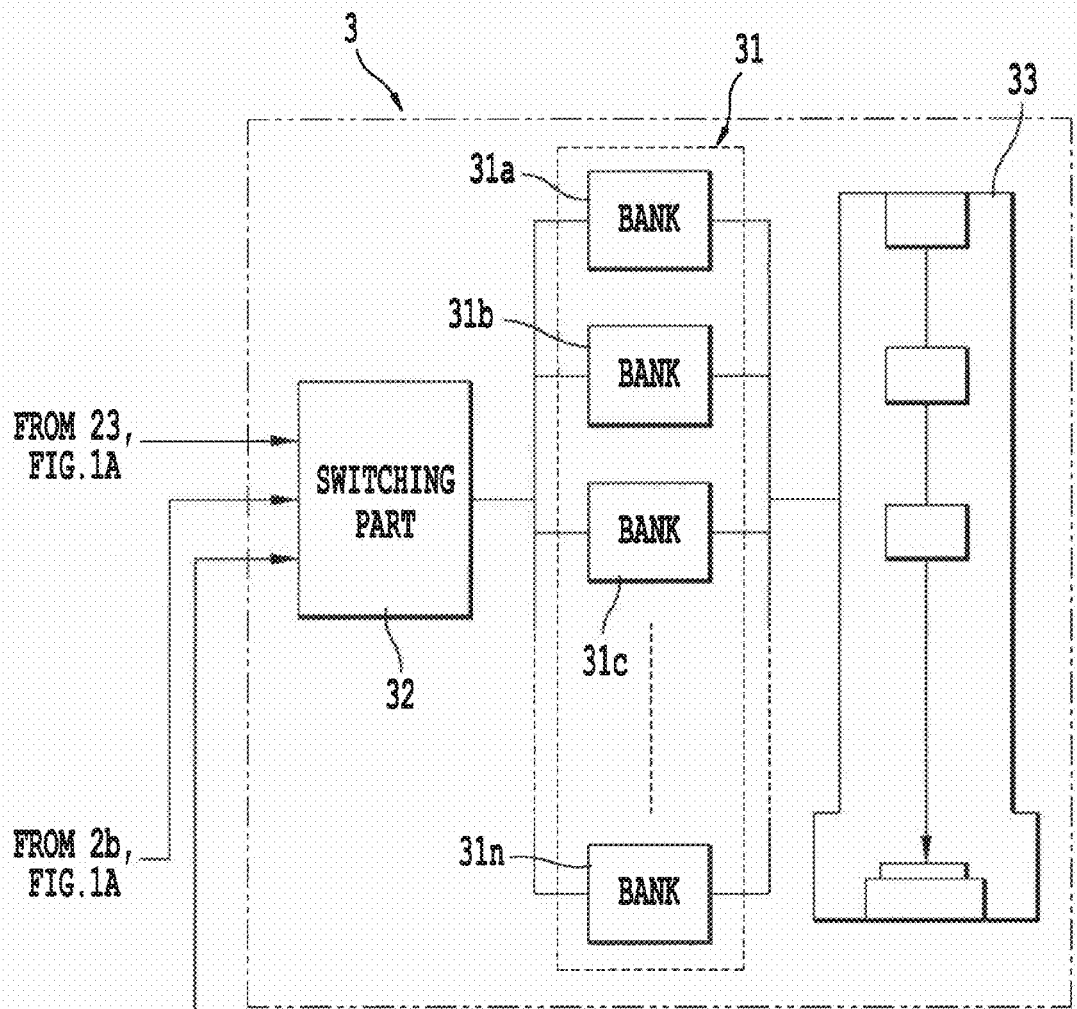

Referring to FIG. 1, reference numeral 1 denotes a host terminal that performs transmission control of divided data, which are divided control data, in the data transfer system according to the present invention. The divided data are generated by a plurality of data generation terminals 1a, 1b, 1c, . . . , and in cluster-connected communicably with the host terminal 1.

The divided data generated by each of the data generation terminals 1a, 1b, 1c, . . . , and in are transmitted randomly to a data transfer apparatus 2 by the instruction of the host terminal 1. The data transfer apparatus 2 in this embodiment is made up of a plurality of data transfer terminals 2a, 2b, and 2c. The number of the transfer terminals is not limited to the above; it may be two or more than four.

The configuration of the data transfer terminals 2b, 2c is the same as that of 2a, and therefore, the configuration of the data transfer terminal 2a is described below.

Reference numeral 21 denotes a memory of the data transfer terminal 2a, where the above plurality of divided data randomly transmitted are stored by the command of a CPU 24.

A parameter list generation part 22 reads information about the order of transfer from the divided data stored in the memory 21 and generates a parameter list, which serves as a menu of the order of transfer.

The parameter list generated in the parameter list generation part 22 is set in a transfer processing part 23. The transfer processing part 23 may be, for example, an extension card (PCI-X card, PCIexpress card, etc., which can be mounted on a general purpose personal computer) based on an FPGA (Field Programmable Gate Array) processor. In this case, the processing in the transfer processing part 23 is performed by the programmed FPGA module.

Each of the divided data stored in the memory 21 is transmitted to the transfer processing part 23 via a chip set 25 based on the control of the CPU 24. The chip set 25 includes: a memory control part 25a that performs control between the memory 21 and the CPU 24; a DMA control part 25b that controls DMA transfer in place of the CPU 24 as a bus master; and a bus control part 25c that performs connection control of the above extension card.

The above-described divided data are transferred in a DMA mode via a high-speed data transfer bus 26 between the chip set 25 and the transfer processing part 23 by bypassing the CPU 24 (i.e., without the help of the CPU 24). The high-speed data transfer bus 26 may be any bus as long as it is a PCI-X bus or PCIexpress bus that accepts the above extension card.

When receiving the divided data, the transfer processing part 23 in which the parameter list is set transfers the divided data to an electron beam drawing apparatus 3 in accordance with the order recorded in the parameter list.

Figure 5:
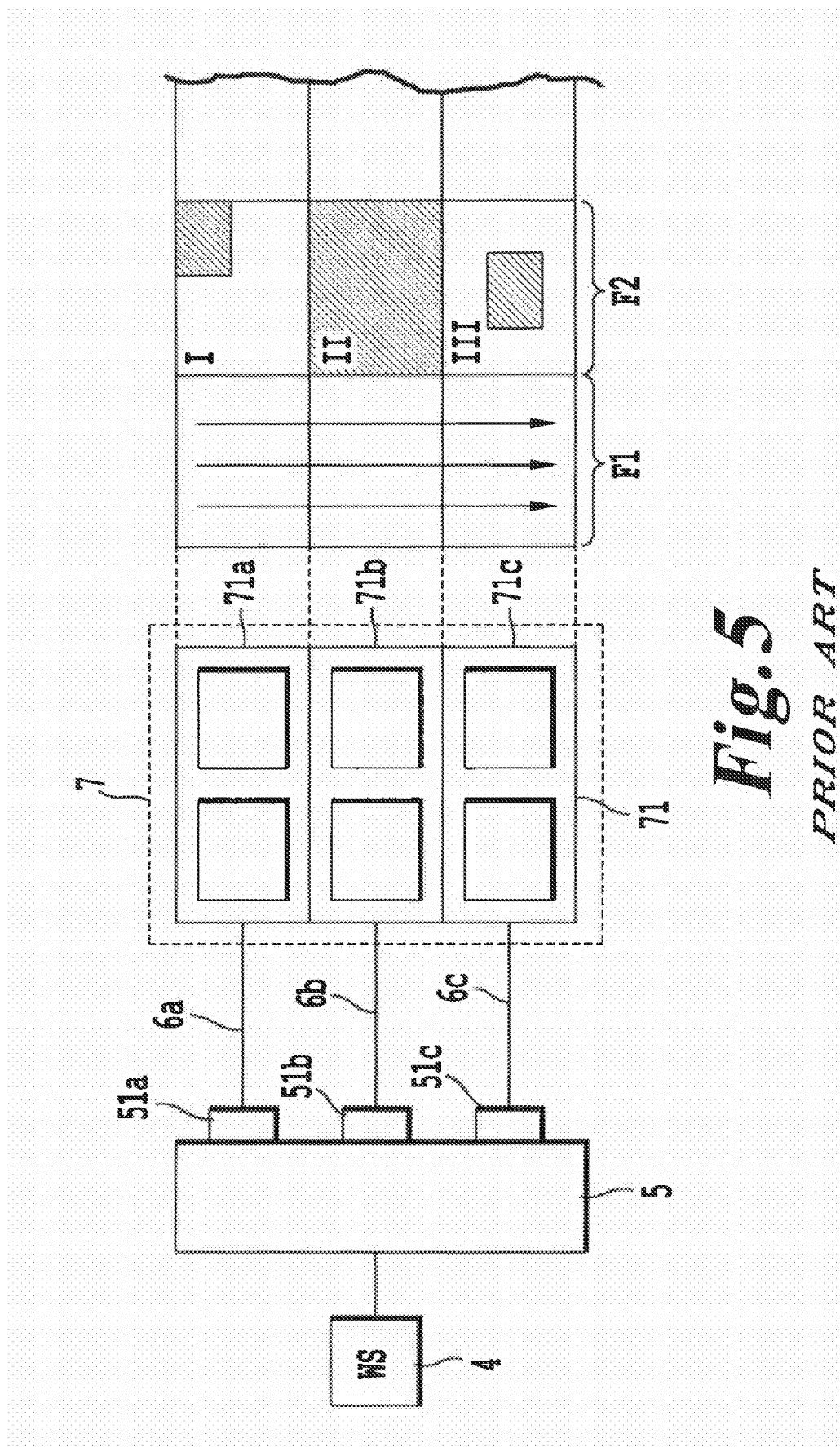
FIG. 5 is a configuration schematic diagram of a conventional data transfer system.

A general purpose personal computer may be used for each of the host terminal 1, the data generation terminals 1a, 1b, 1c, ..., and in, and the data transfer terminals 2a, 2b, and 2c can use a general purpose personal computer. As a result, the system construction cost can be suppressed compared to the conventional data transfer system described in FIG. 5 constituted by the data transfer apparatus 5 comprising the control workstation 4, the interfaces 51a, 51b, and 51c, and the dedicated buses 6a, 6b, and 6c.

A memory 31 of the electron beam drawing apparatus 3 is divided into a plurality of modules in a one-dimensional array and in each module, a plurality of memory banks 31a, 31b, 31c, ..., and 31n to which addresses are assigned in a multi-dimensional manner is formed.

Each of the divided data transferred to the electron beam drawing apparatus 3 is assigned with the predetermined memory bank by a switching part 32 to access a predetermined memory bank in accordance with address information. From the divided data stored in the memory 31, it is possible to obtain a drawing with a desired pattern by properly controlling the drawing operation of an electron beam drawing apparatus main body 33.

Figure 2:
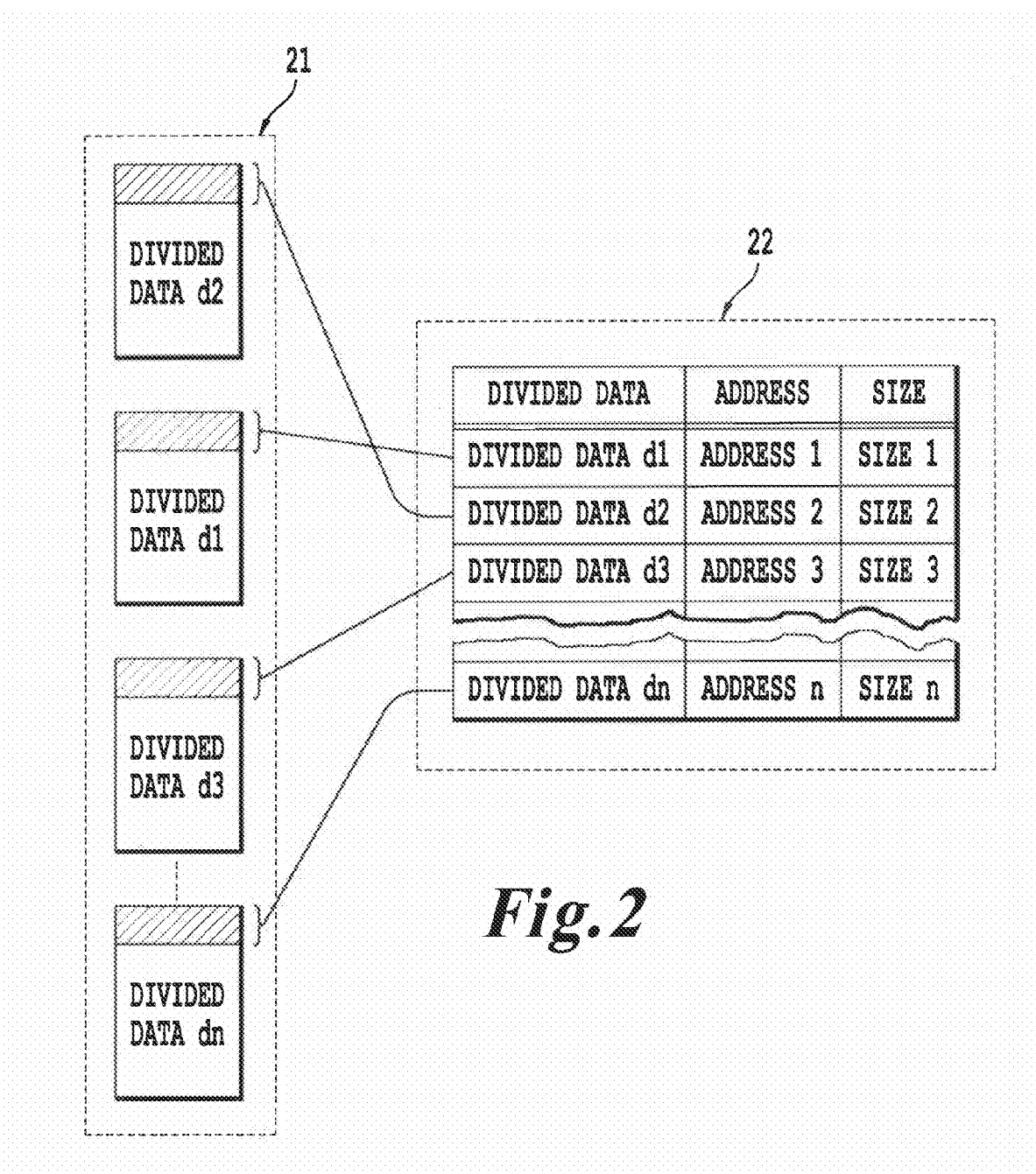
FIG. 2 is an image diagram of a parameter list.

FIG. 2 shows an image diagram of the above parameter list. The divided data are stored randomly in the memory 21 regardless of the order of transfer. In FIG. 2, the divided data d2, the divided data d1, the divided data d3, ..., and the divided data dn are stored in the memory 21 in this order, however, it is assumed that the divided data need to be rearranged in the order of the divided data d1, the divided data d2, the divided data d3, ..., and the divided data dn when they are transferred to the electron beam drawing apparatus 3.

The parameter list generation means 22 extracts the address information and size information of the divided data d2, the divided data d1, the divided data d3, ..., and the divided data dn stored in the memory 21 and generates a parameter list in which the address information and size information of each of the divided data are rearranged in the order of transfer, that is, the order of the divided data d1, the divided data d2, the divided data d3, ..., and the divided data dn.

A flowchart of data transfer processing will be described below using FIG. 3A with reference to FIG. 1 and FIG. 2.

When a plurality of divided data is generated by the data generation terminals 1a, 1b, 1c, ..., and in (S1), the divided data of which the addresses are consecutive are transmitted randomly to a data transfer terminal 2a based on the transmission control by the host terminal 1 (S2).

The data transfer terminal 2a receives the divided data (S3) and stores them in the memory 21 (S4). From the divided data stored randomly, the address information and size information are extracted and a parameter list is generated (S5) The generated parameter list is set in the transfer processing part 23 (S6).

When a request signal to transfer the divided data is transmitted from the transfer processing part 23 to the memory 21 (S7), the divided data are transferred in a DMA mode from the memory 21 to the transfer processing part 23 (S8).

The data transfer terminal 2a transfers the divided data to the electron beam drawing apparatus 3 according to the order in the parameter list (S9).

The electron beam drawing apparatus 3 receives the divided data (S11), controls the apparatus (S12), and draws a predetermined pattern.

Whether or not the data transfer processing is completed is determined (S10) and until completion, the processing in S9 and S10 is repeated. When it is determined that the data transfer is completed, a completion flag is set and a completion flag signal is transmitted to the electron beam drawing apparatus 3 (S13).

When receiving the completion flag signal (S14), the electron beam drawing apparatus 3 transmits a response signal of the completion flag to the data transfer apparatus 2 (S15).

When receiving the response signal (S16), the data transfer apparatus releases the memory 21 (S17) and becomes ready to receive the next divided data.

Figure 3A:
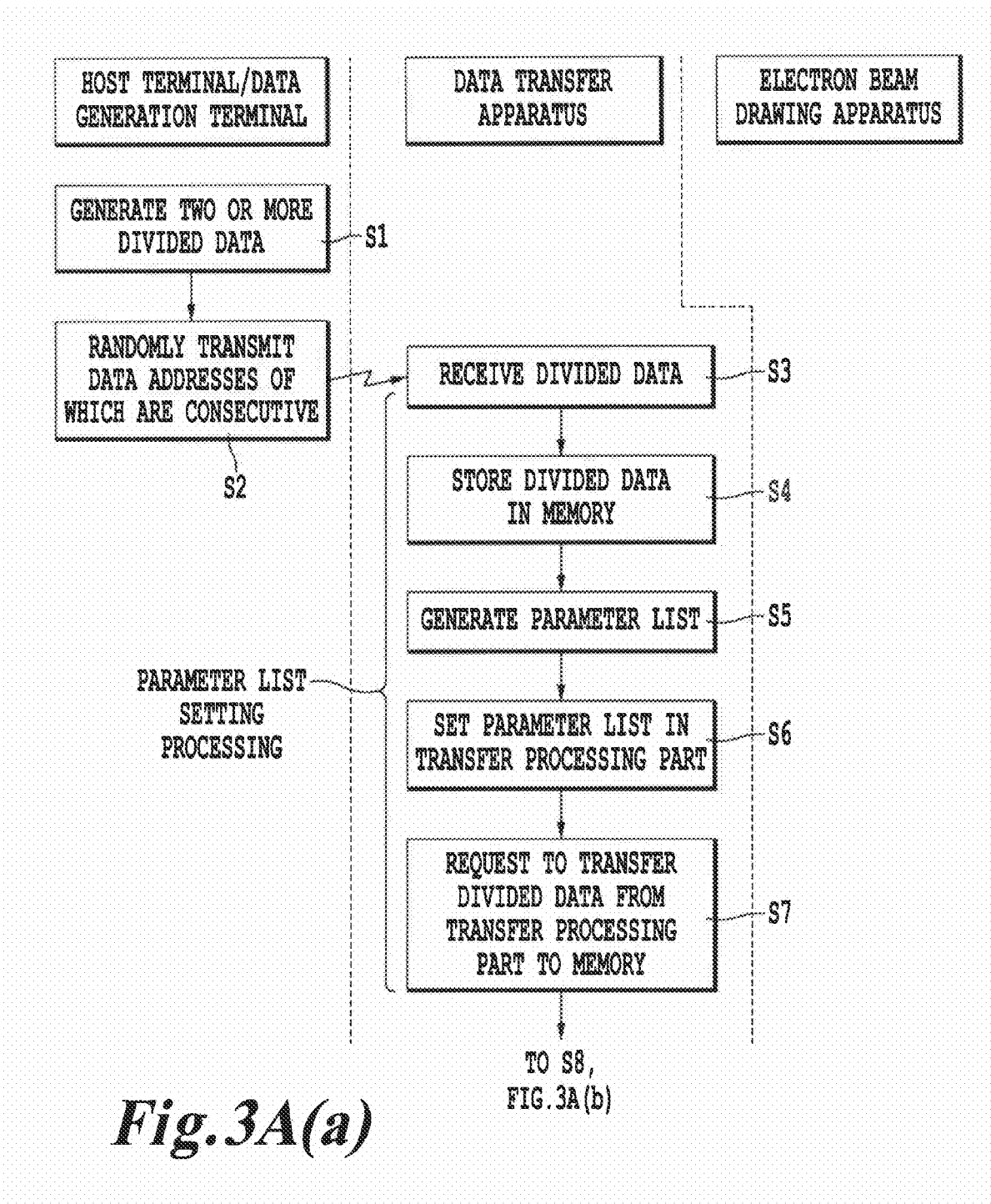
FIG. 3A is a flowchart of data transfer processing and FIG. 3B is a diagram showing a timing chart of data transfer when a plurality of data transfer apparatuses is provided.
Figure 3A:
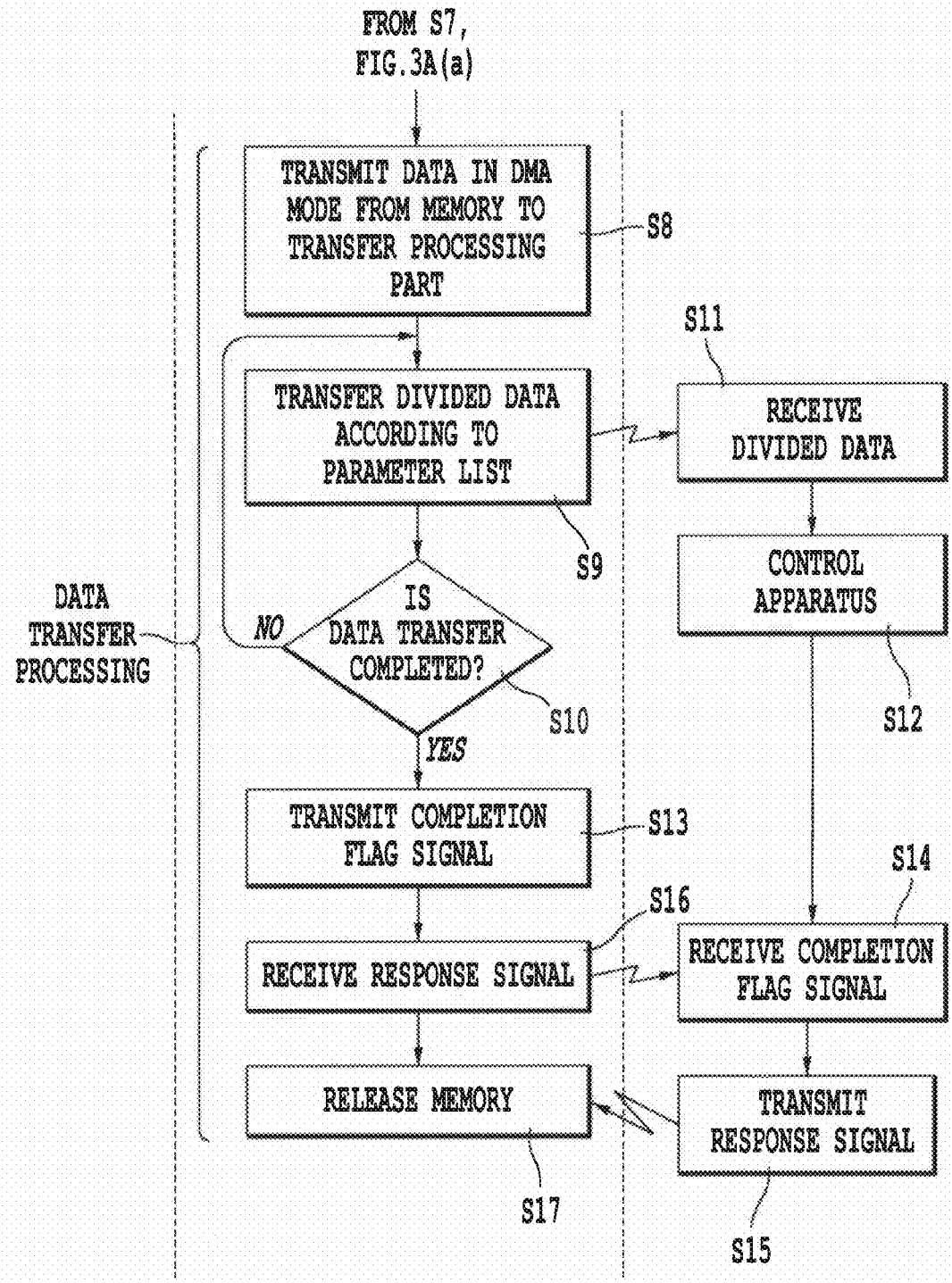
Figure 3B:
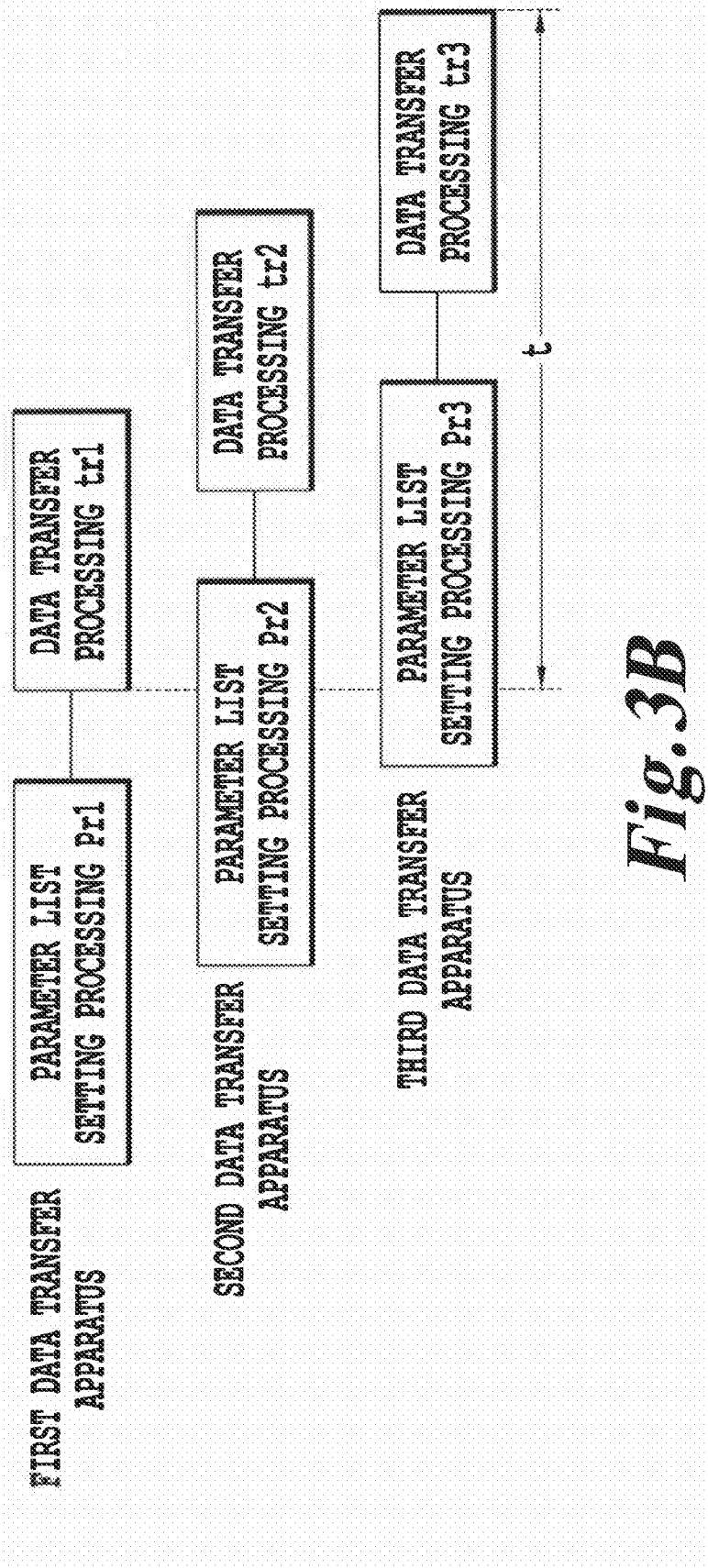

FIG. 3B is a diagram showing a timing chart of data transfer when a plurality of the data transfer apparatuses is provided.

FIG. 3A shows the transfer processing flow of one data transfer apparatus and during the period of execution of processing in S3 to S7 (hereinafter, referred to as "parameter list setting processing"), the CPU is occupied with this processing and therefore the processing in S8 to S17 (hereinafter, referred to as "data transfer processing") cannot be executed.

In order to deal with this, it is possible to provide a plurality of data transfer apparatuses so that the parameter list setting processing and the data transfer processing are performed in parallel time by the different data transfer processing apparatuses and thus the divided data are transferred sequentially in succession.

The successive divided data transfer processing is performed with the transmission timing of the divided data being shifted with respect to each of the data transfer apparatuses by the transmission control means (not shown) of the host terminal 1 (refer to FIG. 1). In other words, the transmission control means transmits divided data to the first data transfer apparatus 1, and after that transmits another divided data to the second data transfer apparatus with a predetermined timing after transmitting divided data to the first data transfer apparatus 1.

The above-described predetermined timing is a timing with which the parameter list setting processing pr1 is executed in the first data transfer apparatus and after the completion of the data transfer processing tr1, the data transfer processing tr2 by the second data transfer apparatus can be started substantially in succession.

This also applies to the case of the third data transfer apparatus, and therefore, after the data transfer processing tr2 by the second data transfer apparatus is completed, it is possible to transmit the divided data to the third data transfer apparatus with timing with which the data transfer processing tr3 by the third data transfer apparatus can be started substantially in succession.

By shifting the operation cycles of the three data transfer apparatuses with predetermined timing, it is possible to execute data transfer in a continuous time t from the data transfer processing tr1 to the data transfer processing tr3, and therefore, a high-speed data transfer can be realized compared to the conventional case where the data transfer processing is performed intermittently as before.

Figure 4A:
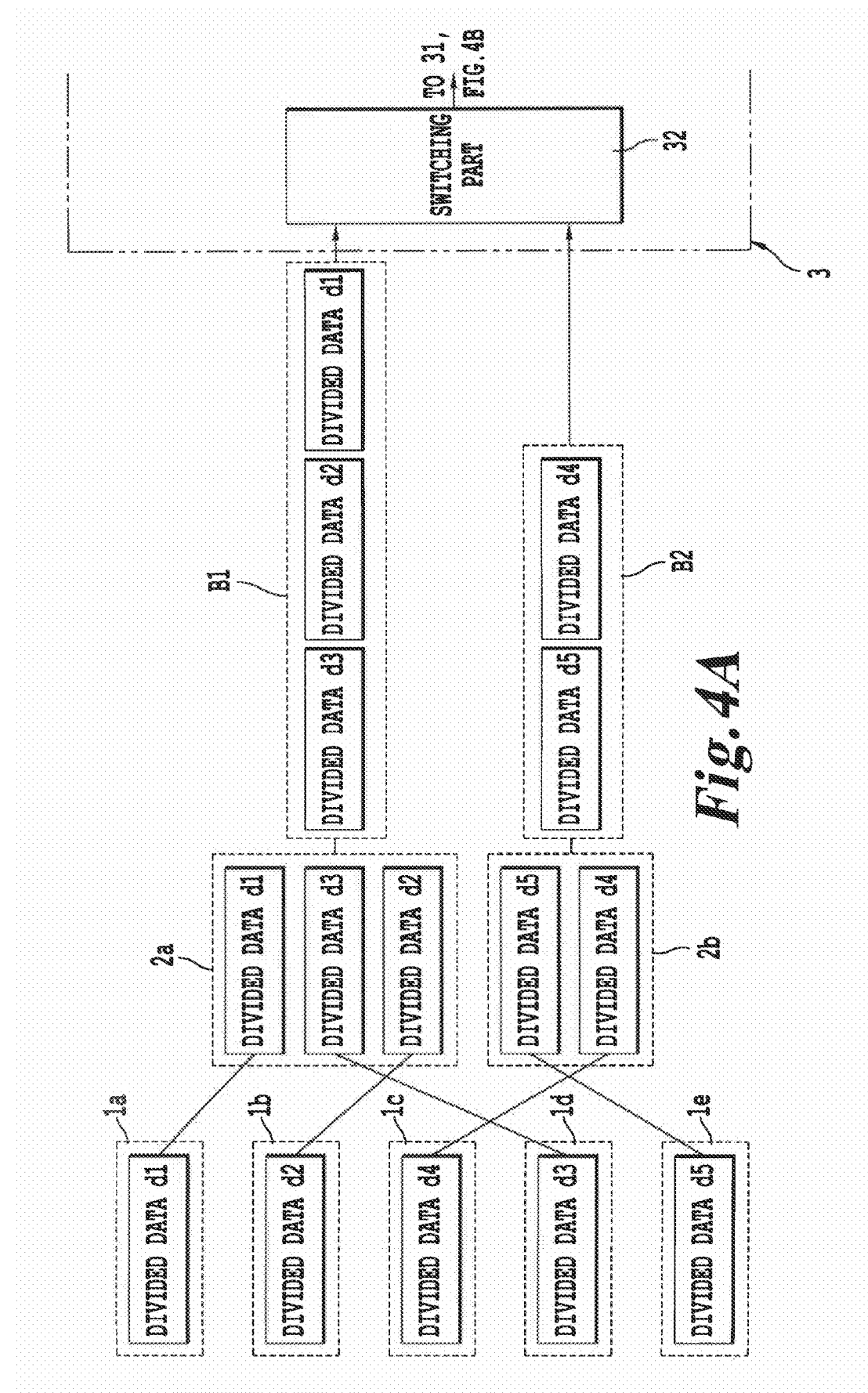
FIG. 4 is a diagram showing the transfer operation of divided data.
Figure 4B:
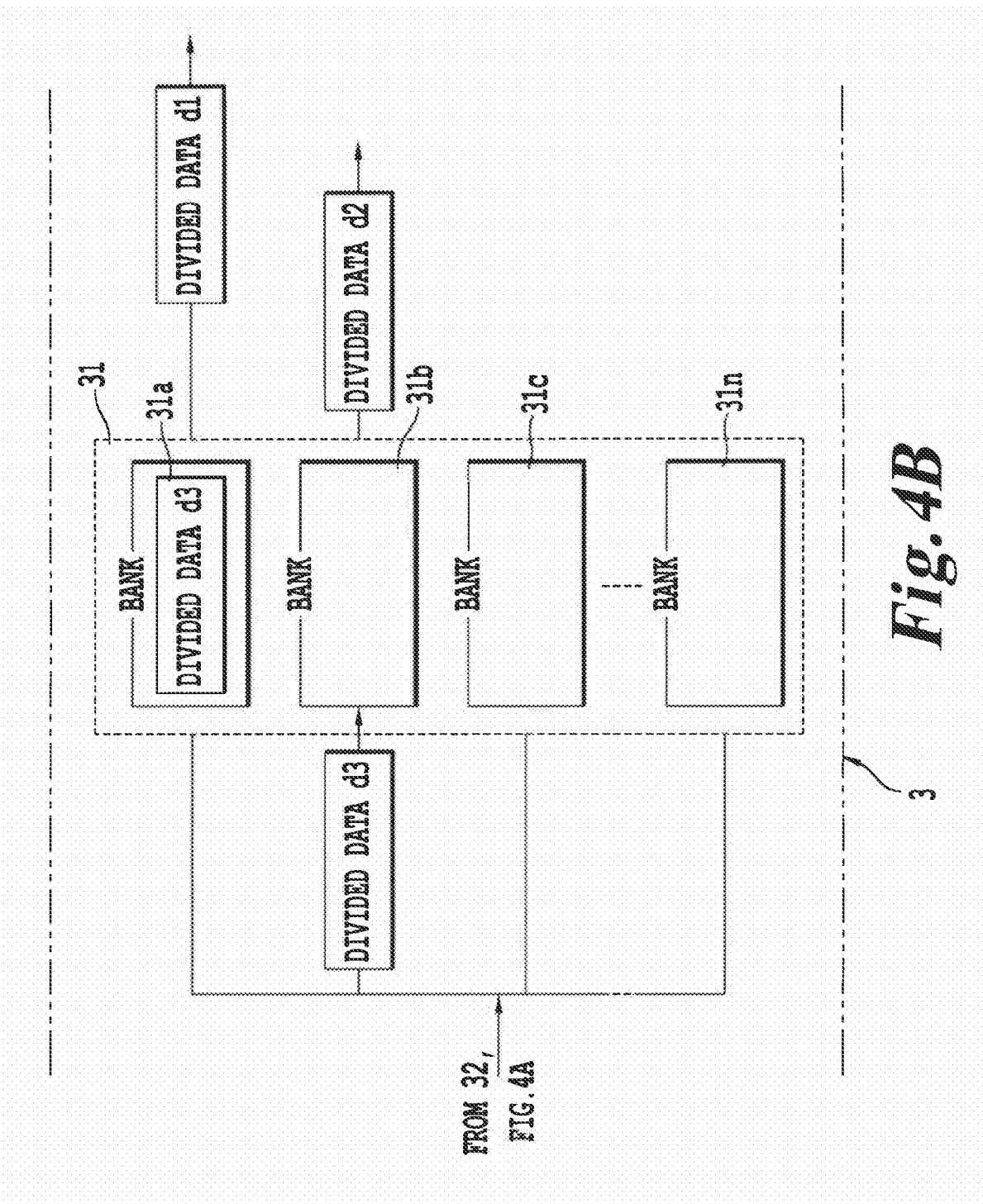

FIG. 4 shows the transfer operation of divided data. In the present embodiment, the embodiment is shown as an example, in which the divided data d1 to the divided data d5 are transferred by the plurality of data transfer apparatuses.

Each of the divided data is shown redundantly, however, those enclosed by the two-dot chain line show the operation history, and at the positions where the data are present actually, the data are shown by those enclosed by the solid line.

The divided data d1 are generated by the data generation terminal 1a, the divided data d2 by the data generation terminal 1b, the divided data d3 by the data generation terminal 1c, the divided data d4 by the data generation terminal 1d, and the divided data d5 by the data generation terminal 1e, respectively, and the data are transmitted to the data transfer terminals 2a and 2b by the host terminal 1.

The order of transferring the divided data to the electron beam drawing apparatus 3 shall be as follows: divided data d1→divided data d2→divided data d3→divided data d4→divided data d5.

In this case, if the data transfer terminal 2a or 2b receives two or more divided data the addresses of which are not consecutive, it is not possible to generate the parameter list.

In order to deal with this, it is possible to randomly group the two or more divided data the addresses of which are consecutive to form block data within a range not exceeding the maximum memory size of the data transfer terminal 2a or 2b and to transmit the data in units of the block data to each data transfer apparatus.

When the maximum memory size of the data transfer terminal 2a is such that the divided data d1 to the divided data d3 can be stored, the divided data d1 to the divided data d3 are stored as block data B1. Similarly, in the data transfer terminal 2b, the divided data d4, d5 are stored as block data B2.

Since the order of the divided data in the block data is controlled by the parameter list at the time of transfer, the data may be stored randomly when stored in the data transfer terminals 2a and 2b. In the present embodiment, when stored in the data transfer terminal 2a, the data are stored in the order of the divided data d2, the divided data d3, and the divided data d1 and when stored in the data transfer terminal 2b, the data are stored in the order of the divided data d5 and the divided data d4.

When the block data B1 and the block data B2 are transferred from the data transfer terminal 2a or the data transfer terminal 2b to the electron beam drawing apparatus 3, the order of the divided data is controlled.

In the memory 31 of the electron beam drawing apparatus 3, the plurality of the memory banks 31a, . . . , and 31n are formed and each of the divided data is stored sequentially in each memory bank assigned as consecutive address spaces by the switching processing of the switching part 32 according to the order of transfer. In other words, the divided data d1 are stored in the memory bank 31a and then the divided data d2 are stored in the memory bank 31b.

FIG. 4 shows a state in which the divided data d1 and the divided data d2 are already read from the memory 31 in order to control the electron beam drawing apparatus 3, part of the divided data d3 is stored in the memory bank 31a in which the divided data d1 have been stored, and the rest of the divided data d3 is about to be stored in the memory bank 31b in which the divided data d2 have been stored. In this manner, the divided data are stored sequentially in the released memory bank, and therefore, a massive amount of control data can be dealt with without depending on the memory size.

Originally, the divided data d3 should be stored in the memory bank 31c, however, when the memory bank 31c is in a defective state due to trouble etc., it is possible for the switching part 32 to remove the memory bank 31c and assign an address. Because of this, it is preferable to provide at least four or more memory banks in order to cause the memory banks to function fully even if a specific memory bank is skipped, with the inner storage space and cost of the electron beam drawing apparatus 3 being taken into account.

The amount of divided data stored in each memory bank can be changed depending on the drawing speed.

What is claimed is:

1. A data transfer system comprising:
   a plurality of data generation terminals that generate divided data of apparatus control data;
   a host terminal that is connected to each data generation terminal for performing transmission control of said divided data;
   a plurality of data transfer apparatuses that randomly receive said divided data, store said data in a memory, and transfer said divided data from an extension card corresponding to a general purpose high-speed data transfer bus; and
   a predetermined apparatus to be controlled by the transferred divided data, wherein
   each of said data transfer apparatuses includes,
      a parameter list generation means that reads information specifying the order of transfer among information including said divided data from the divided data stored in said memory and generates a transfer parameter list in order to control said predetermined apparatus; and
      a transfer processing means that sets the parameter list to said extension card, receives divided data transferred in a DMA mode from said memory via said high-speed data transfer bus by bypassing a CPU, and transfers said divided data to a memory on the side of said predetermined apparatus according to the order recorded in the set parameter list, and
   said host terminal includes a transmission control means that randomly groups two or more divided data having consecutive address information to form block data in a range not exceeding the maximum memory size of each data transfer apparatus and transmits data in units of said block data to any of the data transfer apparatuses.

2. The data transfer system according to claim 1, wherein said parameter list is configured by extracting address information and data size information from each of the divided data.

3. The data transfer system according to claim 2, wherein a memory on the side of said predetermined apparatus is divided into a plurality of modules in a one-dimensional array, memory banks are formed that assign an address to each module in a multi-dimensional manner, and said predetermined apparatus includes a switching means that switches addresses in order to store each of the divided data including said block data in consecutive address spaces when said block data is transferred.

4. The data transfer system according to claim 1, wherein said transmission control means controls the timing of transmitting said block data from each data generation terminal so that said transfer of block data, and generation and setting of parameter list, are processed at the same time by the different data transfer apparatuses and divided data is transferred sequentially in succession.

5. The data transfer system according to claim 1, wherein a memory on the side of said predetermined apparatus is divided into a plurality of modules in a one-dimensional array, memory banks are formed that assign an address to each module in a multi-dimensional manner, and said predetermined apparatus includes a switching means that switches addresses in order to store each of the divided data including said block data in consecutive address spaces when said block data is transferred.

6. A data transfer system comprising:
a plurality of data generation terminals that generate divided data from apparatus control data;
a host terminal that is connected to each data generation terminal for performing transmission control of said divided data;
a data transfer apparatus that randomly receives said divided data, stores said data in a memory, and transfers said divided data from an extension card corresponding to a general purpose high-speed data transfer bus; and
a predetermined apparatus to be controlled by the transferred divided data, wherein
said data transfer apparatus includes,
    a parameter list generation means that reads information specifying the order of transfer among information including said divided data from the divided data stored in said memory and generates a transfer parameter list in order to control said predetermined apparatus; and
    a transfer processing means that sets the parameter list to said extension card, receives divided data transferred in a DMA mode from said memory via said high-speed data transfer bus by bypassing a CPU, and transfers said divided data to a memory on the side of said predetermined apparatus according to the order recorded in the set parameter list, and
a transmission control means controls the timing of transmitting said block data from each data generation terminal so that said transfer of block data, and generation and setting of parameter list, are processed at the same time by the different data transfer apparatuses and divided data is transferred sequentially in succession.

7. The data transfer system according to claim 6, wherein said parameter list is configured by extracting address information and data size information from each of the divided data.

8. A data transfer system comprising:
a plurality of data generation terminals that generate divided data of apparatus control data;
a host terminal that is connected to each data generation terminal for performing transmission control of said divided data;
a data transfer apparatus that randomly receives said divided data, stores said data in a memory, and transfers said divided data from an extension card corresponding to a general purpose high-speed data transfer bus; and
a predetermined apparatus to be controlled by the transferred divided data, wherein
said data transfer apparatus includes,
    a parameter list generation means that reads information specifying the order of transfer among information including said divided data from the divided data stored in said memory and generates a transfer parameter list in order to control said predetermined apparatus; and
    a transfer processing means that sets the parameter list to said extension card, receives divided data transferred in a DMA mode from said memory via said high-speed data transfer bus by bypassing a CPU, and transfers said divided data to a memory on the side of said predetermined apparatus according to the order recorded in the set parameter list, and
a memory on the side of said predetermined apparatus is divided into a plurality of modules in a one-dimensional array, memory banks are formed that assign an address to each module in a multi-dimensional manner, and said predetermined apparatus includes a switching means that switches addresses in order to store each of the divided data including said block data in consecutive address spaces when said block data is transferred.

9. A data transfer system comprising:
a plurality of data generation terminals that generate divided data of apparatus control data;
a host terminal that is connected to each data generation terminal for performing transmission control of said divided data;
a data transfer apparatus that randomly receives said divided data, stores said data in a memory, and transfers said divided data from an extension card corresponding to a general purpose high-speed data transfer bus; and
a predetermined apparatus to be controlled by the transferred divided data, wherein
said data transfer apparatus includes,
    a parameter list generation means that reads information specifying the order of transfer among information including said divided data from the divided data stored in said memory and generates a transfer parameter list in order to control said predetermined apparatus; and
    a transfer processing means that sets the parameter list to said extension card, receives divided data transferred in a DMA mode from said memory via said high-speed data transfer bus by bypassing a CPU, and transfers said divided data to a memory on the side of said predetermined apparatus according to the order recorded in the set parameter list,
    said parameter list being configured by extracting address information and data size information from each of the divided data, and
a memory on the side of said predetermined apparatus is divided into a plurality of modules in a one-dimensional array, memory banks are formed that assign an address to each module in a multi-dimensional manner, and said predetermined apparatus includes a switching means that switches addresses in order to store each of the divided data including said block data in consecutive address spaces when said block data is transferred.

10. The data transfer system according to any one of claims 1, 2, and 6-5, wherein the predetermined apparatus to be controlled by the transferred divided data is an electron beam drawing apparatus, and the divided data is generated by dividing the drawing data to be used in the electron beam drawing apparatus.

* * * * *